(12) United States Patent
Yanazawa et al.

(10) Patent No.: US 9,963,091 B2
(45) Date of Patent: May 8, 2018

(54) ROUTING CONFIGURATION OF WIRE HARNESS

(71) Applicants: YAZAKI CORPORATION, Minato-ku, Tokyo (JP); TOYOTA JIDOSHA KABUSHIKI KAISHA, Toyota-shi, Aichi-ken (JP)

(72) Inventors: Kenta Yanazawa, Makinohara (JP); Hideomi Adachi, Makinohara (JP); Yoshiyuki Ishihara, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days. days.

(21) Appl. No.: 15/259,548

(22) Filed: Sep. 8, 2016

(65) Prior Publication Data
US 2017/0066391 A1    Mar. 9, 2017

(30) Foreign Application Priority Data
Sep. 9, 2015    (JP) ................................. 2015-177225

(51) Int. Cl.
  *H02G 3/04*    (2006.01)
  *B60R 16/02*    (2006.01)
(52) U.S. Cl.
  CPC ....... *B60R 16/0215* (2013.01); *H02G 3/0481* (2013.01)

(58) Field of Classification Search
  CPC .......... H02G 3/04; H02G 3/0481; H01B 7/00; B60R 16/0215
  USPC ........... 174/72 A, 68.1, 69, 70 R, 71 R, 72 R
  See application file for complete search history.

(56) References Cited

U.S. PATENT DOCUMENTS

2011/0120747 A1 * 5/2011 Muneyasu .......... B60R 16/0207
                                                              174/113 R
2011/0297415 A1   12/2011 Katou et al.

FOREIGN PATENT DOCUMENTS

JP    2011254614 A    12/2011

* cited by examiner

*Primary Examiner* — Tremesha S Willis
(74) *Attorney, Agent, or Firm* — Sughrue Mion, PLLC

(57) ABSTRACT

A routing configuration of a wire harness includes an outer member having a tubular shape, and at least one conductive path configured to be contained in and protected by the outer member. In a generally straight wiring portion, the wire harness is routed in such a manner that the outer member is snaked so that portions of an inner surface of the outer member are brought into contact with the at least one conductor path, the generally straight wiring portion being defined as a portion where the wire harness is routed generally straightly between bent wiring portions which are defined as portions where the wire harness is routed being bent so as to conform to shapes of corresponding portions of a routing target, respectively.

3 Claims, 3 Drawing Sheets

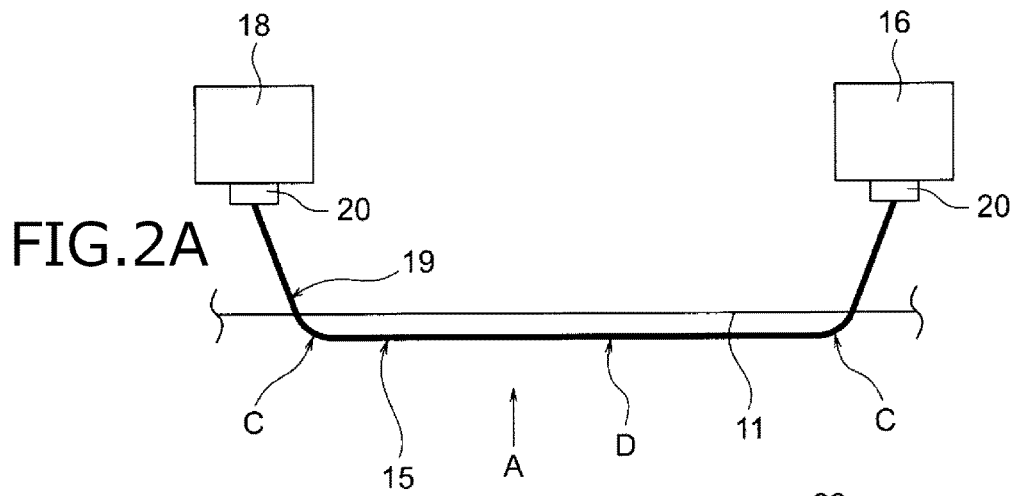
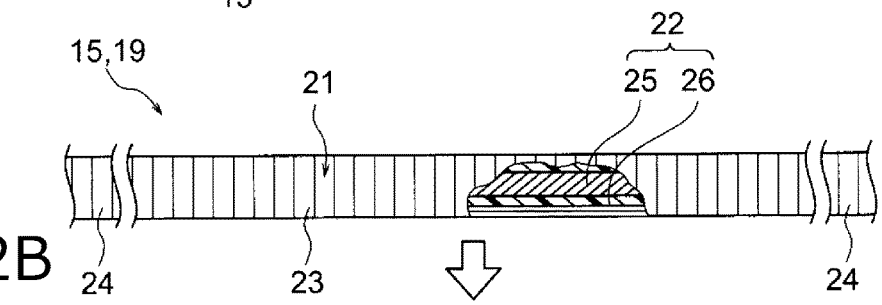
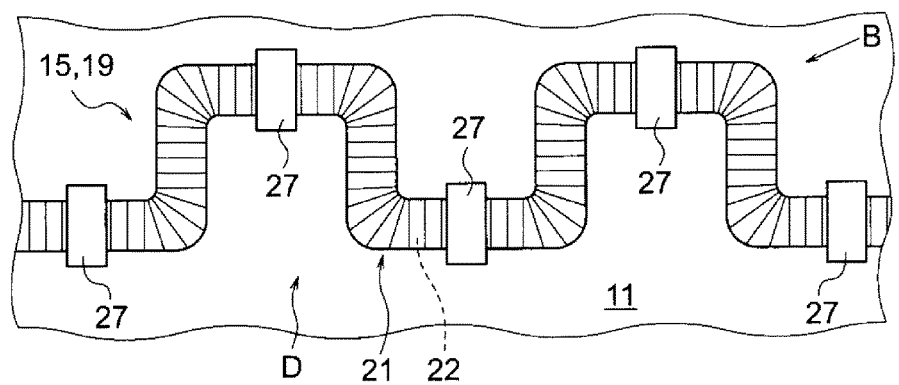

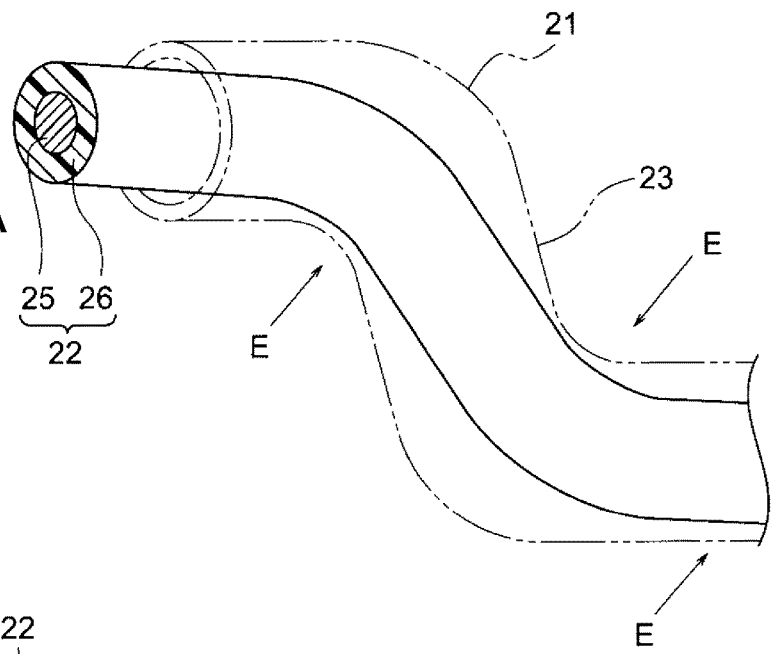
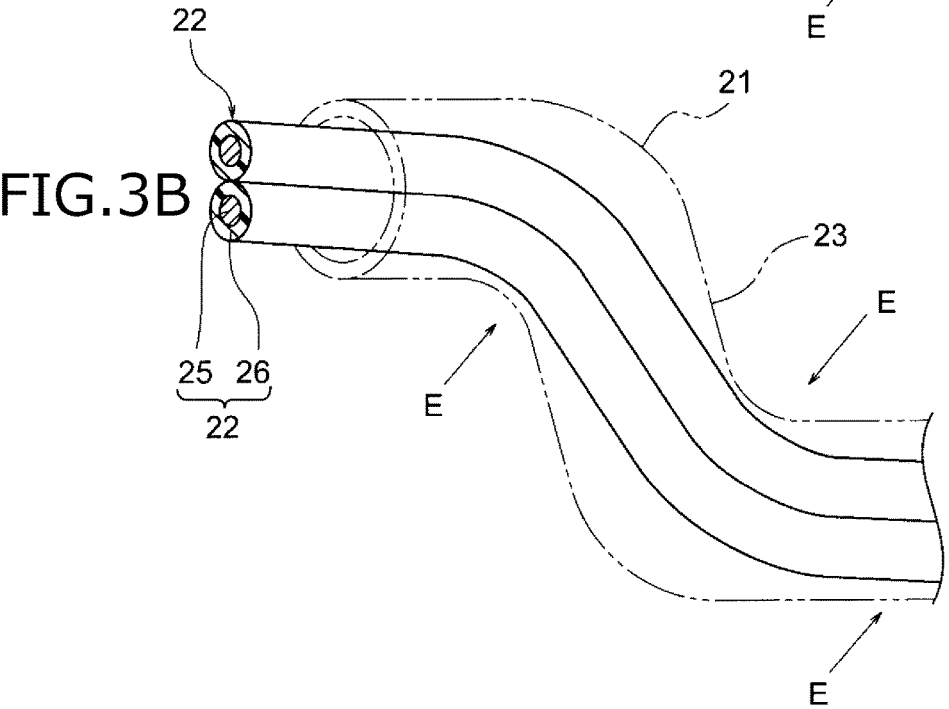

ROUTING CONFIGURATION OF WIRE HARNESS

CROSS REFERENCE TO RELATED APPLICATIONS

This application is based on Japanese Patent Application (No. 2015-177225) filed on Sep. 9, 2015, the contents of which are incorporated herein by reference.

BACKGROUND OF THE INVENTION

1. Field of the Invention

The present invention relates to a routing configuration of a wire harness including a tubular outer member and one or plural conductive paths contained in the outer member and protected by the outer member.

2. Description of the Related Art

Wire harnesses are used for electrically connecting apparatus installed in an automobile. Wire harnesses are equipped with a tubular outer member and one or plural conductive paths housed in the outer member. For example, JP-A-2011-254614 discloses a wire harness which is long and is routed so that part of it runs under the floor of an automobile. The portion, running under the floor of the automobile, of the wire harness goes straightly. In the wire harness disclosed in JP-A-2011-254614, a phenomenon occurs that in its straightly routed portion the conductive path(s) housed in the outer member shakes due to vibration etc. that occur while the automobile is running.

In the above related wire harness, when the conductive path(s) housed in the outer member shakes widely due to vibration that occurs while the automobile is running, a covering (an outside braid or metal foil of the conductive path(s) in the case where it has a shield function) of the conductive path(s) may hit the inner surface of the outer member strongly and thereby be damaged.

SUMMARY OF THE INVENTION

The present invention has been made in view of the above circumstances, and an object of the invention is therefore to provide a wire harness capable of suppressing shaking of a conductive path(s) inside an outer member.

To solve the above problem, the invention provides a routing configuration of a wire harness including: an outer member having a tubular shape; and at least one conductive path configured to be contained in and protected by the outer member, wherein in a generally straight wiring portion, the wire harness is routed in such a manner that the outer member is snaked so that portions of an inner surface of the outer member are brought into contact with the at least one conductor path, the generally straight wiring portion being defined as a portion where the wire harness is routed generally straightly between bent wiring portions which are defined as portions where the wire harness is routed being bent so as to conform to shapes of corresponding portions of a routing target, respectively.

According to the above configuration, the wire harness is routed in such a manner that the outer member is snaked in a portion where the at least one conductive path is prone to shake, and hence portions of the inner surface of the outer member are brought into contact with the at least one conductive path there. This makes it possible to suppress shaking of the conductive path(s) inside the outer member even in a portion where the conductive path(s) would otherwise be prone to shake.

For example, the snaking posture of the outer member is maintained by the fixing members which fix the wire harness to the wiring target.

According to the above configuration, since the snaking posture of the outer member can be maintained by the fixing members, shaking of the conductive path(s) can be prevented without the need for employing new components, by using existing clamps, for example.

BRIEF DESCRIPTION OF THE DRAWINGS

FIG. 1A shows how a high-voltage wire harness is routed and FIG. 1B shows how another wire harness, that is, a low-voltage wire harness, is routed.

FIGS. 2A and 2B illustrate a manner of routing according to the invention; FIG. 2A is a schematic diagram showing bent routing portions and a generally straight routing portion of a harness main body, and a bottom part of FIG. 2B is a bottom view as viewed from the direction indicated by arrow A in FIG. 2A and illustrates the manner of routing according to the invention.

FIG. 3A shows how one conductive path acts inside an outer member at the portion indicated by arrow B in FIG. 2B, and FIG. 3B shows how two conductive paths act inside an outer member at the portion indicated by arrow B in FIG. 2B.

DETAILED DESCRIPTION OF THE EXEMPLARY EMBODIMENTS

To suppress shaking of a conductive path(s) inside an outer member, the wire harness according to the invention employs a routing configuration in which after the conductive path(s) is inserted and contained in the outer member, the outer member is snaked so that portions of the conductive path(s) are brought into contact with the inner surface of the outer member. This manner of routing is employed in a generally straight wiring portion which is defined as a portion where the wire harness is routed generally straightly between bent wiring portions which are defined as portions where the wire harness is routed being bent so as to conform to shapes of corresponding portions of a routing target, respectively.

Embodiment

An embodiment of the invention will be hereinafter described with reference to the drawings. The embodiment is such that the invention is applied to a wire harness that is routed in a hybrid vehicle. (The invention may also be applied to an electric vehicle, an ordinary automobile that runs using an engine, and the like).

<Configuration of Hybrid Vehicle 1>

Figure 1A:
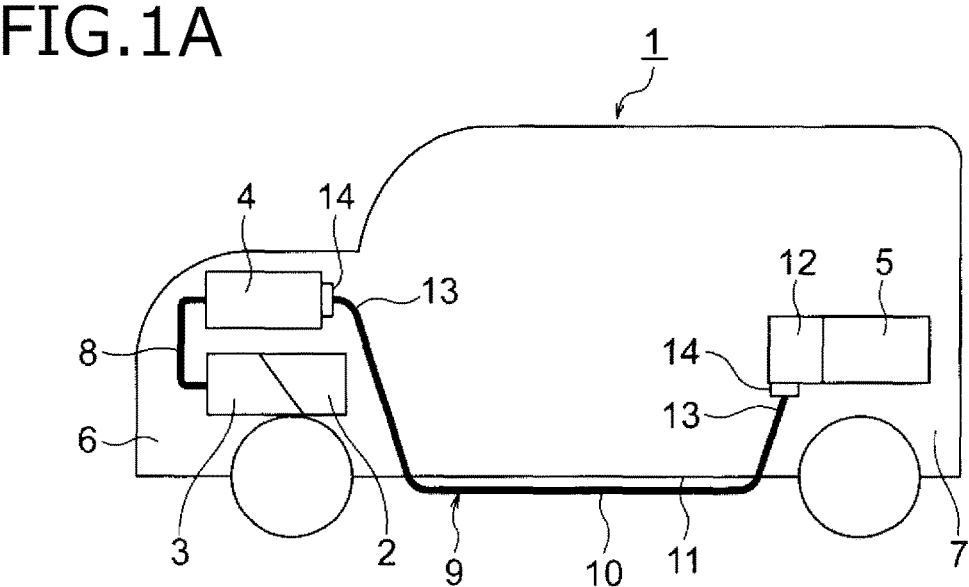
FIGS. 1A and 1B show wire harnesses according to an embodiment of the present invention.

As shown in FIG. 1A, a hybrid vehicle 1 is driven by mixing two kinds of motive power of an engine 2 and a motor unit 3. Electric power is supplied from a battery (battery pack) 5 to the motor unit 3 via an inverter unit 4. In the embodiment, the engine 2, the motor unit 3, and the inverter unit 4 are mounted in an engine room 6 which is located adjacent to the front wheels etc. The battery 5 is mounted in a vehicle rear part 7 where the rear wheels etc. are disposed (or may be mounted in a vehicle compartment which is located in the rear of the engine room 6).

The motor unit 3 and the inverter unit 4 are connected to each other by a high-voltage wire harness (high-voltage motor cable) 8. Likewise, the battery 5 and the inverter unit 4 are connected to each other by a high-voltage wire harness 9. An intermediate portion 10 of the wire harness 9 is routed under a vehicle floor 11 of the vehicle (vehicle body) approximately parallel with it. The vehicle floor 11, which is a known vehicle body part and is what is called a panel member, is formed with through-holes at prescribed positions. The wire harness 9 is inserted through the through-holes water-tightly.

The wire harness 9 and the battery 5 are connected to each other via a junction block 12 which is attached to the battery 5. An external connection unit such as a shield connector 14 provided for a rear-end harness terminal 13 of the wire harness 9 is electrically connected to the junction block 12. The wire harness 9 is electrically connected to the inverter unit 4 via an external connection unit such as another shield connector 14 provided for a front-end harness terminal 13 of the wire harness 9.

The motor unit 3 includes a motor and a generator. The inverter unit 4 includes an inverter and a converter. The motor unit 3 is implemented as a motor assembly including a shield case. Likewise, the inverter unit 4 is implemented as an inverter assembly including a shield case. The battery 5 is of a Ni—MH type or a Li ion type and is implemented as a module. Alternatively, an electric storage device such as a capacitor can be used as the battery 5. There are no particular limitations on the battery 5 as long as it can be used for the hybrid vehicle 1 (or an electric vehicle).

Figure 1B:
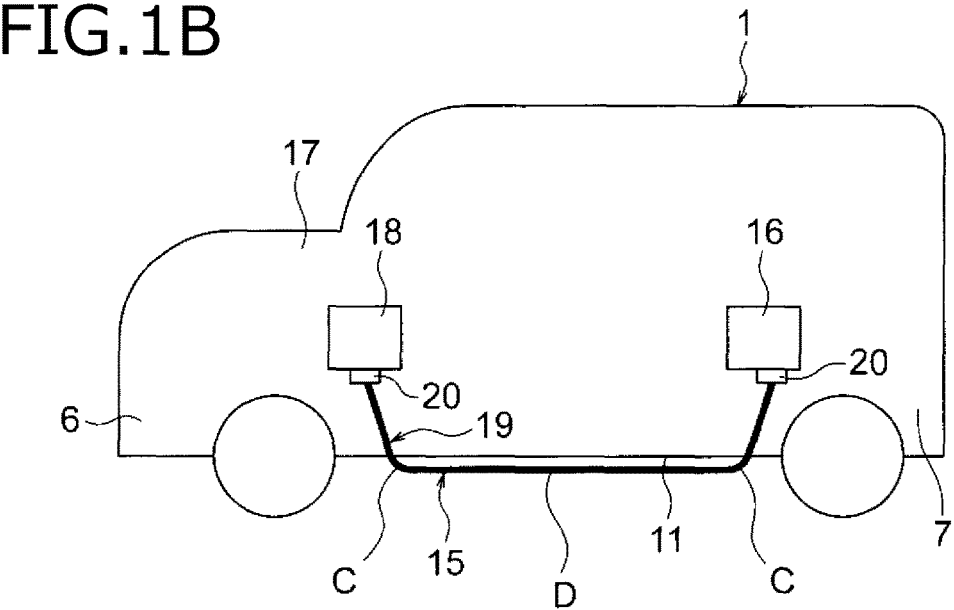

As shown in FIG. 1B, a wire harness 15, which is a low-voltage wire harness, is provided to electrically connect a low-voltage battery 16 disposed in the vehicle rear part 7 of the hybrid vehicle 1 to an auxiliary device (device) 18 mounted in a vehicle font part 17. Like the wire harness 9 shown in FIG. 1A, part of the wire harness 15 is routed under the vehicle floor 11 (this is just an example; it may be routed on the compartment side).

As shown in FIGS. 1A and 1B, the high-voltage wire harnesses 8 and 9 and the low-voltage wire harness 15 are routed in the hybrid vehicle 1. Although the invention is applicable to any of them, the following description will be made of a representative one, that is, the low-voltage wire harness 15.

<Configuration of Wire Harness 15>

As shown in FIG. 1B, the long wire harness 15, part of which is routed under the vehicle floor 11, includes a harness main body 19 and connectors 20 provided for the two respective terminals of the harness main body 19. The wire harness 15 also includes fixing members (e.g., clamps 27; described later) for wiring itself along a prescribed route and water stop members (e.g., grommets; not shown).

<Configuration of Harness Main Body 19>

As shown in FIGS. 2A and 2B and FIGS. 3A and 3B, the harness main body 19 includes an outer member 21 and one conductive path (FIG. 3A) or two conductive paths 22 (FIG. 3B) which is or are contained in the outer member 21 and protected by the outer member 21. Although the wire harnesses 15 according to the embodiment have one or two conductive paths 22, they are just examples and wire harnesses having three or more conductive paths 22 are possible. A wire harness having plural conductive paths 22 may incorporate a high-voltage conductive path.

In the harness main body 19, portions denoted by arrow C in FIG. 1A correspond to "bent routing portions" and a portion denoted by arrow D in FIG. 1A is a "generally straight routing portion". That is, the bent routing portions C are portions in regions where the wire harness 15 is wired being bent so as to conform to shapes of attachment (fixing) target portions (wire harness routing target portions) of the vehicle body. The generally straight routing portion D is the portion between the bent routing portions C (i.e., the portion routed under the vehicle floor 11).

The structures of the outer member 21 and the conductive path(s) 22 of the harness main body 19 will be described first and the manufacturing method of the wire harness 15 and the routing configuration that charactering the invention will be described thereafter.

<Outer Member 21>

As shown in FIG. 2A, the outer member 21 is formed by resin molding as a single, straight (before use) tubular member. (In the invention, the material of the outer member 21 is not limited to a resin; it may be made of a metal as long as it is capable of snaking (described later).) In the embodiment, the outer member 21 is configured with no divided portion extending along an axis direction thereof; in other words, it has no slit(s). The outer member 21 is circular in cross section.

In the embodiment, the portion (straight routing correspondence potion 23), corresponding to the generally straight routing portion D of the harness main body 19, of the outer member 21 is formed like a bellows tube (in the invention, the shape of the straight routing correspondence potion 23 is not limited to any particular shape as long as it is capable of snaking (described later)). More specifically, the straight routing correspondence potion 23 is shaped so as to have circumferential bellows recesses and bellows projections that are arranged continuously and alternately in the tube axis direction. In the embodiment, the portions (bent routing correspondence portions 24), corresponding to the bent routing portions C of the harness main body 19, of the outer member 21 are also formed like bellows tubes.

<Conductive Path 22>

As shown in FIG. 2A and FIGS. 3A and 3B, the conductive path 22 has a conductor 25 and an insulator 26 which is located outside the conductor 25. The conductor 25 is made of copper, a copper alloy, aluminum, or an aluminum alloy and is circular in cross section. The conductor 25 may be formed by twisting element wires together or have a rod structure that is rectangular or circular in cross section (e.g., a rectangular core or circular core conductor; in this case, the harness main body 19 also has a rod structure). The insulator 26 which is made of an insulative resin material is formed on the outer circumferential surface of the conductor 25 by extrusion molding.

The insulator 26 is formed on the outer circumferential surface of the conductor 25 by extrusion molding using a thermoplastic resin material. The thermoplastic resin material is selected as appropriate from various known materials, for example, polymeric materials such as a polyvinyl chloride resin, a polyethylene resin, and a polypropylene resin.

<Manufacturing Method of Wire Harness 15>

To manufacture the wire harness 15 shown in FIG. 2, the harness main body 19 is manufactured first and then terminal working is done. The harness main body 19 is manufactured by inserting the conductive path(s) 22 into the outer member 21 in straight shape from its one opening toward the other opening. After the manufacture of the wire harness 15, it is packed into a prescribed load form and carried to a vehicle assembling plant. Then the wire harness 15 is wired along a prescribed route of a vehicle.

<Manner of Routing>

As shown in FIGS. 2A and 2B, the wire harness 15 is routed in the same manner as in the related case between the bent routing portion C and the battery 16 and between the other bent routing portion C and the auxiliary device 18. In the generally straight routing portion D between the bent routing portions C, the wire harness 15 is routed in the manner of routing according to the invention. In other words, in the routing region under the vehicle floor 11 where the conductive path(s) 22 is prone to shake, the wire harness 15 is routed in a form (described below) which characterizes the invention.

In the generally straight routing portion D, the wire harness 15 is routed in such a manner that the outer member 21 is snaked in, for example, the manner shown in FIG. 2B, whereby portions (e.g., the portion indicated by arrow B in FIG. 2B and the portions indicated by arrows E in FIGS. 3A and 3B) of the inner surface of the outer member 21 are brought into contact with the conductive path(s) 22. In the manner of routing according to the invention, because of the contact at these portions, the conductive path(s) 22 is held by the outer member 21 in a certain sense, whereby shaking of the conductive path(s) 22 relative to the outer member 21 is suppressed. The snaking of the outer member 21 is maintained by attaching clamps 27 (fixing members) for routing the wire harness 15 along a prescribed route, in, for example, the manner shown in FIG. 2B.

As described above with reference to FIGS. 1A and 1B to FIGS. 3A and 3B, in the invention, the wire harness 15 is routed in such a manner that the outer member 21 is snaked in a portion where the conductive path(s) 22 is prone to shake, that is, the generally straight routing portion D, and hence portions of the inner surface of the outer member 21 are brought into contact with the conductive path(s) 22 there. This makes it possible to suppress shaking of the conductive path(s) 22 relative to the outer member 21, and in turn to prevent an event that the insulator 26 of the conductive path(s) 22 hits the inner surface of the outer member 21 strongly and is thereby damaged. (A braid or a metal foil can be prevented from being damaged in the case where the conductive path(s) 22 has a shield function.)

It goes without saying that various modifications are possible without departing from the spirit and scope of the invention.

What is claimed is:

1. A routing configuration of a wire harness comprising:
   an outer member having a tubular shape; and
   at least one conductive path configured to be contained in and protected by the outer member,
   wherein in a substantially straight wiring portion, the wire harness is routed in such a manner that the outer member is snaked so as to have a plurality of bent portions, each bent portion having a bent angle of substantially 90 degrees, the substantially straight wiring portion being defined as a portion where the wire harness is routed substantially straightly between bent wiring portions which are defined as portions where the wire harness is routed being bent so as to conform to shapes of corresponding portions of a routing target, respectively,
   wherein portions of an inner surface of the outer member are brought into contact with corresponding portions of the at least one conductive path in the bent portions, and
   wherein in each of the bent portions of the outer member, a bent angle of a corresponding action of the at least one conductive path is greater than 90 degrees.

2. The routing configuration of the wire harness according to claim 1, wherein a snaking posture of the outer member is maintained by fixing members which fix the wire harness to the routing target.

3. The routing configuration of the wire harness according to claim 1, wherein an inner surface of a snaked portion of the outer member suppresses shaking of the at least one conductive path.

* * * * *